R. DANIELS.
Vegetable Cutter.
No. 7,681.
Patented Oct. 1, 1850.
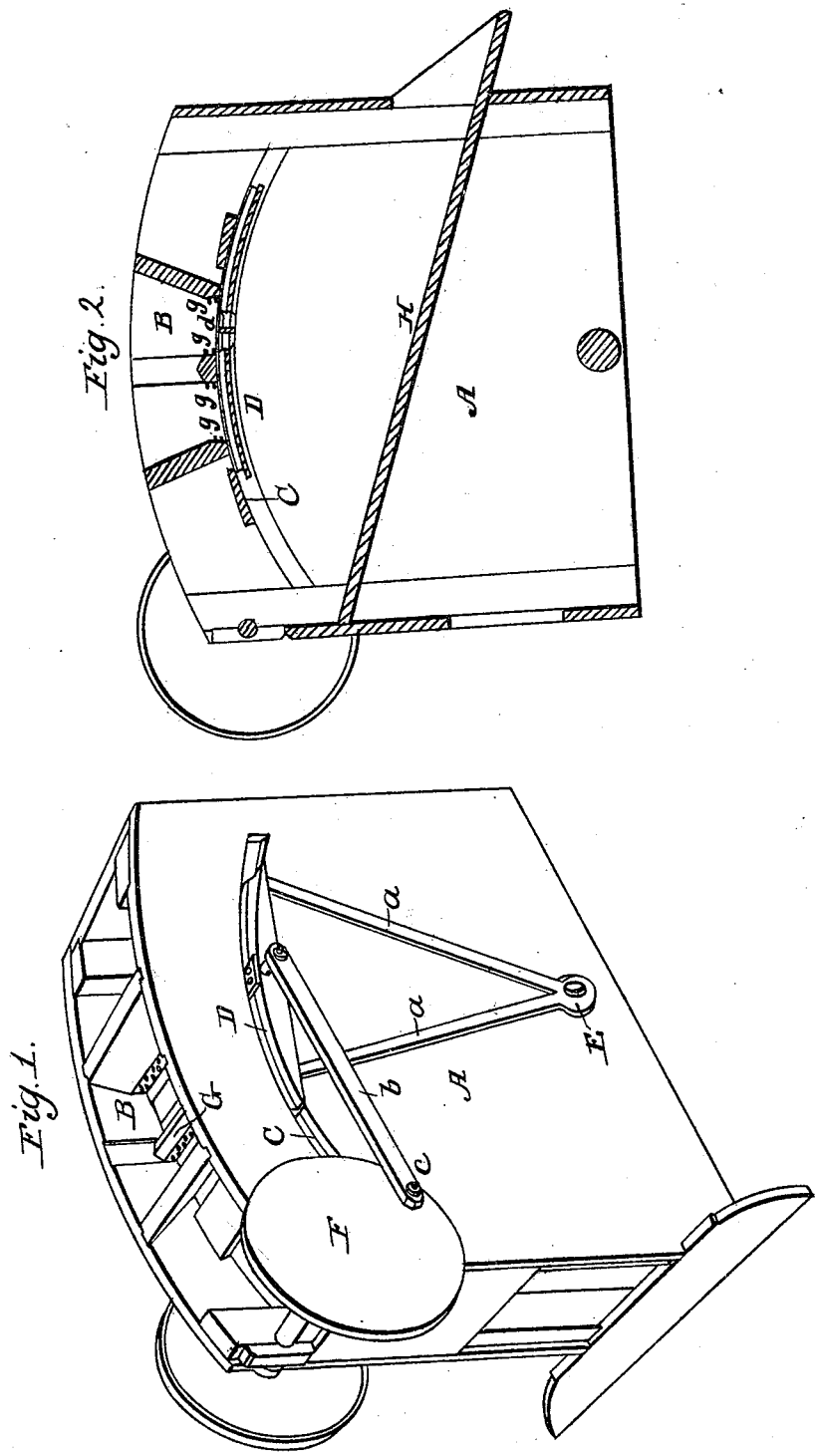

UNITED STATES PATENT OFFICE.

REUBEN DANIELS, OF WOODSTOCK, VERMONT.

VEGETABLE-CUTTER.

Specification of Letters Patent No. 7,681, dated October 1, 1850.

*To all whom it may concern:*

Be it known that I, REUBEN DANIELS, of Woodstock, in the county of Windsor and State of Vermont, have invented a new and useful Improvement in Machines for Slicing Vegetables, of which the following is a full, clear, and exact description, reference being had to the accompanying drawing, which forms part of this specification, and in which—

Figure 1 is a view in perspective of my machine, and Fig. 2 is a vertical longitudinal section of the same.

My vegetable cutter is composed mainly of a hopper in which the vegetables are introduced and of a curved reciprocating hopper bottom which is furnished with a double edge knife and is caused to move to and fro beneath the hopper, by means of suitable mechanical devices, in such manner that the substances introduced within the hopper are alternately acted upon by the opposite edge of the knife; the hopper is also fitted with removable cutter bars which support the articles introduced within it against the action of the knives, and which can be removed whenever the articles are of such size that they would be prevented by the bars from coming in contact with the moving bottom.

In the accompanying drawing, A is a frame or case to which the remaining portions of the machine are attached and by which they are supported at a convenient distance above the ground. A hopper B is formed in the upper part of this case and parallel circular slots C of equal radii are cut its opposite sides. The curved bottom D of the hopper is connected by radius bars *a* with an axle E whose axis is a line drawn through the centers whence the circular slots are described, this axle is also connected by a pair of connecting rods *b* with crank pins *c* projected from a pair of balance wheels F, which are secured to the opposite extremities of a horizonal shaft; the latter is supported in boxes on the standards of the case and is turned by means of a handle which is fitted to the prolonged extremity of one of the crank pins. A transverse opening is made at the middle of this curved bottom and a double edged knife *d* is fitted above it. The opening at the bottom of the hopper is divided by one or more removable bars G, depending upon the size of the machine and the work to be performed, into two or more spaces. The lower edges of these bars and the lower edges of the hopper boards are furnished with teeth *g* to catch and hold the articles in the hopper while under the action of the knife. An inclined board H is fitted within the case beneath the curved bottom to receive and discharge the sliced vegetables.

The machine may be managed by two attendants, one of whom turns the fly wheel shaft and thus communicates a vibratory motion to the curved bottom, while the other introduces the vegetables into the hopper. As the bottom moves to and fro the vegetables in contact with it are sliced by the knife, while they are prevented from escaping by the teeth on the hopper-sides and on the removable bars. The sliced pieces fall upon the inclined board beneath the moving hopper bottom whence they are discharged. If the articles to be operated upon are of large size, as pumpkins for example, the removable bars are withdrawn to allow them to come in contact with the moving bottom; but if small sized articles such as potatoes are to be sliced, as many of the removable bars as possible are inserted in the hopper so as to divide the space at the bottom into small compartments, each having toothed edges to hold the articles, so that as the knife traverses from one end to the hopper to the other it cuts successive slives from the articles which are supported against its action by the removable bars. This device of removable toothed bars is of great value when cutting small articles which would otherwise turn and slip under the action of the knife, while it, at the same time fits a machine capable of cutting small vegetables with ease and rapidity, for the cutting of the largest vegetables which the farmer may wish to slice.

What I claim as my invention and desire to secure by Letters Patent is—

The combination of the double edged reciprocating blade with the hopper and removable bars, for slicing vegetables substantially as herein set forth.

In testimony whereof I have hereunto subscribed my name.

REUBEN DANIELS.

Witnesses:
P. H. WATSON,
ALFRED ARNOLD.